United States Patent

Baker et al.

[11] 3,727,699
[45] Apr. 17, 1973

[54] SUPPORT MEANS FOR CYLINDER CONDUITS

[76] Inventors: Donald C. Baker, Rosedale, Krikor Yessayan, Brazil, both of Ind.

[73] Assignee: J. I. Case Company, Racine, Wis.

[22] Filed: Aug. 13, 1971

[21] Appl. No.: 171,707

[52] U.S. Cl. ...................172/809, 92/146, 92/161
[51] Int. Cl. .................................................E02f 3/76
[58] Field of Search ....................285/137 R, 62; 92/117, 118, 119, 146, 161; 248/56, 68; 172/803, 804, 805, 806, 807, 808, 809

[56] References Cited

UNITED STATES PATENTS

| 3,422,729 | 1/1969 | Kirchler | 172/809 |
| 2,530,414 | 11/1950 | Wells | 172/806 |
| 2,126,791 | 8/1938 | Low | 172/809 |
| 2,787,065 | 4/1957 | Bock et al. | 172/809 |
| 1,315,225 | 9/1919 | Hughes | 248/68 R |
| 2,712,167 | 7/1955 | Blanchard | 248/68 R |
| 2,466,352 | 4/1949 | Armington | 92/118 |

FOREIGN PATENTS OR APPLICATIONS

| 827,964 | 2/1960 | Great Britain | 92/119 |
| 800,813 | 12/1950 | Germany | 92/119 |

Primary Examiner—Charles J. Myhre
Assistant Examiner—R. H. Lazarus
Attorney—Max Dressler et al.

[57] ABSTRACT

Conduit support means for conduits that supply pressurized fluid to opposite ends of a cylinder that is pivoted about a fixed pivot axis. The support means consists of a member that is supported for rotation about the pivot axis of the cylinder with rigid conduits having one end fixed to the support member and the opposite ends fixed to the respective ends of the cylinder so that the cylinder, conduits and support member are pivoted as a unit about a common pivot axis.

9 Claims, 3 Drawing Figures

PATENTED APR 17 1973 3,727,699
FIG. 1
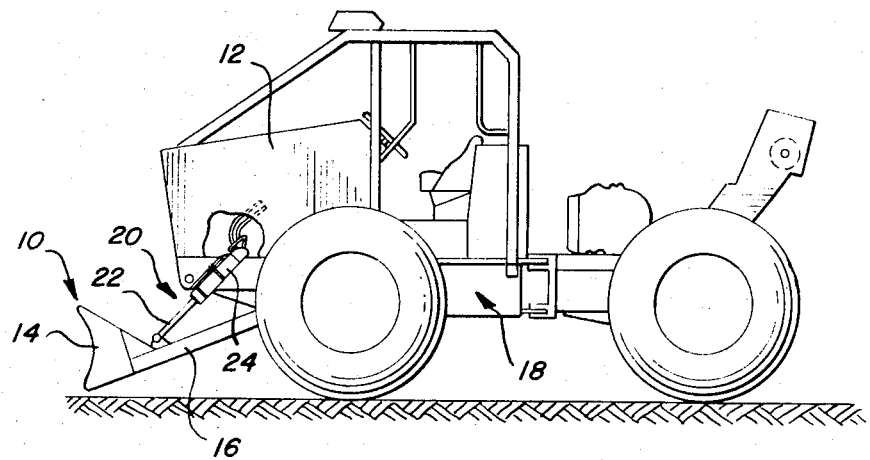
FIG. 2
FIG. 3
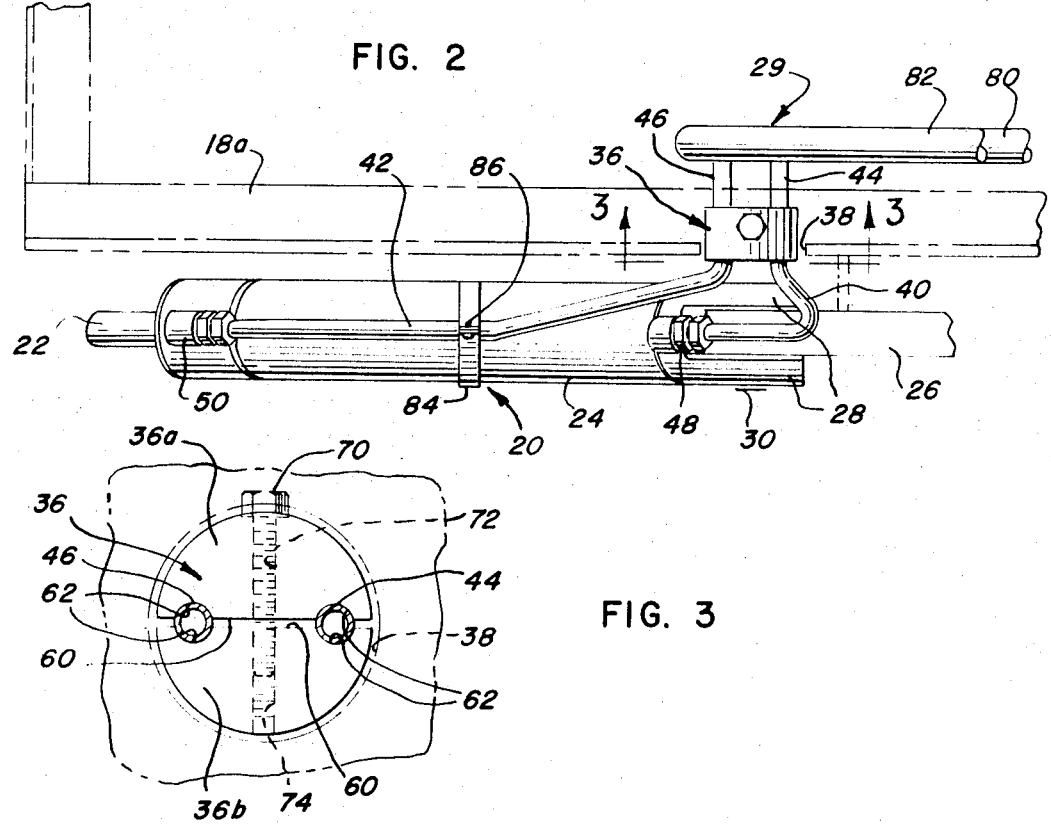

3,727,699

SUPPORT MEANS FOR CYLINDER CONDUITS

BACKGROUND OF THE INVENTION

The present invention relates to implements that are moved between raised and lowered positions on a vehicle through fluid rams and more particularly to an improved support mechanism for conduits that supply fluid to opposite ends of the ram.

In various types of agricultural or earth working implements, such as bucket loaders, doser blades and other vehicle mounted units, it is conventional to support the implement on lift arms that are pivoted on the vehicle frame and are raised and lowered with fluid rams. Fluid under pressure is delivered to opposite ends of the respective cylinders of the rams from a source that normally is an integral part of the vehicle. It has been customary to utilize flexible conduits for interconnecting the opposite ends of the cylinder with the fluid source. However, such an arrangement has been a considerable problem since many times, the vehicles are utilized in areas where materials fall upon the flexible conduits resulting in a rupture of the conduit and loss of fluid.

The problem is particularly acute on doser blades that are used in forestry areas for clearing logs, trees and other material. Many times, trash, large stones, logs, fallen trees and other material come into contact with the hoses and may result in damage to the flexible hoses. While the use of flexible hoses has been plagued with these problems for many years, their use has continued since no satisfactory alternatives have been proposed.

SUMMARY OF THE INVENTION

The present invention contemplates a unique arrangement for supporting the conduits in a manner that allows for the use of rigid tubing in place of the flexible hosing in exposed areas. This is accomplished with a minimum number of inexpensive parts that are arranged in a cooperating manner with the fluid ram so that the support means, the conduits and the fluid cylinder all pivot about a common pivot axis.

The conduit support means consists of a conduit support member that has one end of rigid conduits fixed thereto while the opposite ends of the rigid conduits are fixed to opposite ends of the cylinder. The conduit support member consists of a circular element that is supported in a circular opening in the frame of the vehicle with the opening and the element having their centers aligned with the pivot axis for the fluid cylinder.

With this arrangement, the inner ends of the rigid conduits may be connected to the fluid source through flexible hosing that is completely enclosed within the framework of the vehicle. The present arrangement, while extremely inexpensive to incorporate into existing vehicle mounted implements, considerably reduces the maintenance cost and down time for earth working implements, such as those that are used in extremely woody areas.

BRIEF DESCRIPTION OF THE SEVERAL VIEWS OF DRAWINGS

FIG. 1 of the drawing shows an earth working implement having the present invention incorporated therein with certain parts broken away;

FIG. 2 is an enlarged fragmentary plan view of a portion of the implement shown in FIG. 1; and FIG. 3 is a section view taken generally along line 3—3 of FIG. 2.

DETAILED DESCRIPTION

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings illustrates a earth working implement 10 supported on a vehicle 12 that is of the articulated type. In the illustrated embodiment, the earth working implement consists of a doser blade 14 that is supported on the vehicle 12 by a pair of lift arms 16 (only one being shown), which have their free ends pivoted on the frame 18 of the vehicle. The blade 14 is adapted to be raised and lowered on the vehicle through a pair of fluid rams 20 (only one being shown) that have their piston rods 22 connected to the lift arms adjacent the doser blade and their cylinders 24 pivoted on the frame 18. As more clearly illustrated in FIG. 2, each cylinder 24 is pivoted on an arm 26 that forms part of the frame 18 and is located in spaced relation to the main portion of the frame 18a, shown in phantom line in FIG. 2. In the illustrated embodiment, the head end of the cylinder has a pair of lugs 28 located on opposite sides of the arm 26 with a pin 30 extending through openings in the lugs 28 as well as the arm 26 and defining the pivot axis for the cylinder. Fluid under pressure is delivered from a source (not shown) that normally is part of the articulated vehicle 12 through conduit means 29.

According to the invention, the conduit means are arranged and supported in such a manner that rigid conduits may be utilized in exposed areas where the conduits may be subjected to debris and other foreign matter.

As more clearly shown in FIG. 2, the conduit support means of the invention consists of a support member 36 that is circular and is located in an opening 38 in the frame 18a. The circular opening 38 has its axis aligned with the pivot axis of the cylinder 24, defined by the pin 30, and the conduit support member is likewise circular and has a diameter less than the diameter of the opening 36. The support member 36 also has its axis aligned with the axis defined by pin 30, and is supported in a manner which will be described later. The conduit means consists of first and second rigid conduits 40 and 42 that each have one end 44, 46 fixed for movement with the support member 36, as will be described later. The other or opposite end of the first rigid, metalic conduit or tube 40 is connected through a coupling 48 to one end or the head end of the cylinder 24 while the other end of the rigid, metallic conduit or tube 42 is connected to the opposite end or rod end of the cylinder through a similar coupling 50.

As more clearly shown in FIG. 3, the support member or circular element 36 consists of two substantially circular halves 36a and 36b that have substantially planar mating surfaces 60. Each of the mating surfaces 60 has a pair of spaced substantially semi-circular recesses 62 extending from the associated surface. The recesses on the adjacent mating surfaces are aligned with each other and cooperate to define a pair of openings that respectively receive the ends 44 and 46 of the rigid conduits 40 and 42. The ends 44 and 46 are fixedly secured to the support member 36 through clamp means in the form of a bolt 70 that extends through an opening 72 in the first half 36a and is received in a threaded opening 74 in the other half of the support element. Thus, the two halves are interconnected by the clamp means or single bolt 70 and the bolt securely fixes the ends of the rigid conduits to the support element.

The conduit means further includes first and second flexible hoses 80 and 82 that are connected to the inner ends 44 and 46 of the rigid conduits and lead to the source of fluid under pressure (not shown).

In order to insure that the longer rigid tube 42 is not deflected from its original position, it is desirable to have additional clamp means for connecting an intermediate portion of conduit or tube 42 to the intermediate portion of the cylinder. This clamp means is illustrated as a band 84 surrounding the cylinder and having its free ends interconnected by a screw 86. If desired, a small block or wedge may be interposed between the adjacent surfaces of the conduit 42 and the cylinder 24 so that the conduit extends parallel to the axis of the cylinder, as is shown in FIG. 1.

From the above description, it will be appreciated that the rigid conduits 40 and 42 maintain the support member 36 in a position of alignment with the axis of the opening 38 in the web portion of the frame element 18 and also in alignment with the pivot axis for the cylinder. Thus, as fluid is supplied to opposite ends of the cylinder 24, to pivot the cylinder about its pivot axis 30 and raise and lower the implement 14, the support member 36 and the conduits 40 and 42 likewise are pivoted about a pivot axis in alignment with the axis for the cylinder. This allows for the enclosure of all of the flexible hosing that is required in the fluid system.

What is claimed is:

1. In combination with a fixed frame and a member pivoted about a fixed pivot on said frame by a fluid ram having a piston-rod and cylinder respectively connected to said member and said frame with conduit means for supplying fluid to opposite ends of said cylinder, the improvement of support means on said frame defining a pivot axis for said cylinder; and a conduit support member supported for movement about said pivot axis for said cylinder and in which said conduit means includes rigid conduits respectively having one end fixed to said support member and opposite ends fixed to opposite ends of said cylinder so that said cylinder, conduits and support member are pivoted as a unit about a common pivot axis.

2. The combination as defined in claim 1, in which said frame has a circular opening having its axis aligned with said common pivot axis and said support member comprises a circular element having a diameter less than the diameter of said circular opening and located within said opening.

3. The combination as defined in claim 2, in which said support element includes substantially semi-circular halves having substantially planar mating surfaces each having a pair of spaced substantially semi-circular aligned recesses extending therefrom, said recesses cooperating with each other to define a pair of openings respectively receiving one end of each conduit; and clamp means for clamping said conduits in said recesses.

4. The combination as defined in claim 1, in which said cylinder has a head end and a rod end with said head end pivoted on said support means, further including clamp means connecting an intermediate portion of the conduit connected to said rod end to said cylinder.

5. The combination as defined in claim 1, in which said frame forms a portion of a vehicle and said member pivoted about a fixed pivot is an earth working implement pivoted on said vehicle between raised and lowered positions.

6. In a vehicle having a frame with an earth working implement pivoted on said frame; a fluid ram including a cylinder having one end pivoted about a fixed pivot axis on said frame and a piston rod having a free end connected to said implement and means for supplying fluid to opposite ends of said cylinder, the improvement of said means for supplying fluid including first and second rigid, metallic tubes each having one end connected to respective ends of said cylinder and in communication therewith, and a support member interconnecting the opposite ends of said tubes for rotation about an axis on said frame that is aligned with said fixed pivot axis so that said tubes, cylinder and support member are rotated about a common pivot axis.

7. The combination as defined in claim 6, in which said support member comprises substantially semi-circular halves having cooperating means for receiving said tubes and clamp means interconnecting said halves.

8. The combination as defined in claim 7, in which said frame has an opening larger than the diameter of said halves with the opening having an axis aligned with the fixed pivot axis for cylinder and receiving said support member for substantially unobstructed rotation therein.

9. The combination as defined in claim 8, further including second clamp means for securing said second tube to an intermediate portion of said cylinder tube.

* * * * *

UNITED STATES PATENT OFFICE
CERTIFICATE OF CORRECTION

Patent No. 3,727,699          Dated April 17, 1973

Inventor(s) Donald C. Baker and Krikor Yessayan

It is certified that error appears in the above-identified patent and that said Letters Patent are hereby corrected as shown below:

Column 2, line 14, "a earth working" should be --an earth working--.

Column 2, line 57, "metalic" should be --metallic--.

Column 4, line 49, "for cylinder" should be --for said cylinder--.

Column 4, line 54, delete "tube" (second occurrence).

Signed and sealed this 1st day of October 1974.

(SEAL)
Attest:

McCOY M. GIBSON JR.
Attesting Officer

C. MARSHALL DANN
Commissioner of Patents